United States Patent
Skinner et al.

(10) Patent No.: US 9,232,552 B2
(45) Date of Patent: *Jan. 5, 2016

(54) DIRECT DIGITAL SIGNAL PROCESSOR CONTROL OF MULTI-CHANNEL SCAN FOR RE-ESTABLISHING CONNECTIONS IN A WIRELESSLY NETWORKED DEVICE

(71) Applicant: QUALCOMM Incorporated, San Diego, CA (US)

(72) Inventors: Craig S. Skinner, Snohomish, WA (US); John Brown, Lynnwood, WA (US); William Wong, Issaquah, WA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/320,292

(22) Filed: Jun. 30, 2014

(65) Prior Publication Data

US 2014/0313960 A1    Oct. 23, 2014

Related U.S. Application Data

(63) Continuation of application No. 12/578,122, filed on Oct. 13, 2009, now Pat. No. 8,797,931, which is a continuation of application No. 11/114,271, filed on Apr. 25, 2005, now Pat. No. 7,602,742, which is a continuation of application No. 09/847,768, filed on May 1, 2001, now Pat. No. 6,901,276.

(51) Int. Cl.
| | | |
|---|---|---|
| *H04W 52/02* | (2009.01) | |
| *H04W 76/02* | (2009.01) | |
| *H04W 72/00* | (2009.01) | |
| *H04W 48/16* | (2009.01) | |

(52) U.S. Cl.
CPC ............ *H04W 76/028* (2013.01); *H04W 48/16* (2013.01); *H04W 52/0209* (2013.01); *H04W 52/0245* (2013.01); *H04W 72/005* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 5,229,995 | A | 7/1993 | Strawczynski et al. |
| 5,280,650 | A | 1/1994 | Sobti |
| 5,566,366 | A | 10/1996 | Russo et al. |
| 5,592,173 | A | 1/1997 | Lau et al. |
| 5,722,059 | A | 2/1998 | Campana, Jr. |
| 5,950,120 | A | 9/1999 | Gardner et al. |
| 6,058,289 | A | 5/2000 | Gardner et al. |

(Continued)

*Primary Examiner* — Brandon Renner
(74) *Attorney, Agent, or Firm* — Mahamedi Paradice LLP

(57) ABSTRACT

A method and system for establishing a wireless connection between a portable computer system and a wireless network, particularly when the portable computer system goes out of coverage and a wireless connection needs to be re-established. The portable computer system has a main processor and a digital signal processor (DSP). The main processor is placed in a low power mode, conserving battery power. When the portable computer system goes out of coverage, broadcast channels used by the wireless network are scanned by the DSP instead of the main processor to identify channels that have sufficient signal strength for the wireless connection. Thus, the main processor remains in the low power mode. When the DSP identifies acceptable channels, it wakes up the main processor and identifies the channels having sufficient signal strength. The main processor then establishes a wireless connection using one of the channels identified by the DSP.

37 Claims, 5 Drawing Sheets

(56) References Cited

U.S. PATENT DOCUMENTS

| | | |
|---|---|---|
| 6,219,796 B1 | 4/2001 | Bartley |
| 6,236,674 B1 | 5/2001 | Morelli et al. |
| 6,289,228 B1 | 9/2001 | Rotstein et al. |
| 6,311,282 B1 | 10/2001 | Nelson et al. |
| 6,353,645 B1 | 3/2002 | Solve et al. |
| 6,356,538 B1 | 3/2002 | Li |
| 6,445,937 B1 | 9/2002 | Dasilva |
| 6,456,604 B1 | 9/2002 | Lee et al. |
| 6,510,524 B1 | 1/2003 | Osborn et al. |
| 6,671,266 B1 | 12/2003 | Moon et al. |
| 6,671,509 B1 | 12/2003 | Tanaka et al. |
| 6,684,083 B1 | 1/2004 | Harimoto |
| 6,804,542 B1 | 10/2004 | Haartsen |
| 6,854,116 B1 | 2/2005 | Anderson et al. |
| 6,865,375 B1 * | 3/2005 | McCrank et al. ............... 455/70 |
| 6,901,276 B1 | 5/2005 | Skinner et al. |
| 6,950,645 B1 | 9/2005 | Kammer et al. |
| 6,952,571 B1 | 10/2005 | Garrabrant et al. |
| 7,007,180 B2 | 2/2006 | Hashimoto |
| 7,602,742 B1 | 10/2009 | Skinner et al. |
| 8,014,832 B1 | 9/2011 | Garrabrant et al. |
| 2001/0011024 A1 | 8/2001 | Lundby et al. |
| 2001/0053681 A1 | 12/2001 | Alon et al. |
| 2001/0053710 A1 | 12/2001 | Gibbons et al. |
| 2002/0082010 A1 | 6/2002 | Koorapaty et al. |
| 2002/0112199 A1 | 8/2002 | Whetsel |
| 2006/0189359 A1 | 8/2006 | Kammer et al. |
| 2010/0027452 A1 | 2/2010 | Skinner et al. |

\* cited by examiner

500

```
┌─────────────────────────────────────┐
│   PLACE MAIN PROCESSOR IN SLEEP MODE│
│                 505                 │
└─────────────────┬───────────────────┘
                  ▼
┌─────────────────────────────────────┐
│ IDENTIFY NEED TO ESTABLISH WIRELESS │
│    CONNECTION WITH WIRELESS NETWORK │
│                 510                 │
└─────────────────┬───────────────────┘
                  ▼
┌─────────────────────────────────────┐
│  UNDER DIRECTION OF THE DSP, SCAN   │
│     CHANNELS USED BY THE NETWORK    │
│                 515                 │
└─────────────────┬───────────────────┘
                  ▼
┌─────────────────────────────────────┐
│ USING THE DSP, DETERMINE CHANNELS   │
│  ACCEPTABLE FOR THE WIRELESS        │
│          CONNECTION                 │
│                 520                 │
└─────────────────┬───────────────────┘
                  ▼
           ◇ CHANNELS FOUND? ◇ ── NO ──▶ (back to 515)
                 525
                  │ YES
                  ▼
┌─────────────────────────────────────┐
│ USING THE DSP, RANK THE CHANNELS BY │
│          SIGNAL STRENGTH            │
│                 530                 │
└─────────────────┬───────────────────┘
                  ▼
┌─────────────────────────────────────┐
│       DSP WAKES MAIN PROCESSOR      │
│                 535                 │
└─────────────────┬───────────────────┘
                  ▼
┌─────────────────────────────────────┐
│ USING THE MAIN PROCESSOR, ESTABLISH │
│      THE WIRELESS CONNECTION        │
│                 540                 │
└─────────────────────────────────────┘
```

FIGURE 5

DIRECT DIGITAL SIGNAL PROCESSOR CONTROL OF MULTI-CHANNEL SCAN FOR RE-ESTABLISHING CONNECTIONS IN A WIRELESSLY NETWORKED DEVICE

CROSS-REFERENCE TO RELATED APPLICATIONS

The present application is a continuation of U.S. patent application Ser. No. 12/578,122, filed Oct. 13, 2009, for "Direct Digital Signal Processor Control of Multi-Channel Scan for Re-Establishing Connections in a Wirelessly Networked Device", which claims priority as a continuation of U.S. patent application Ser. No. 11/114,271, filed Apr. 25, 2005, now U.S. Pat. No. 7,602,742, which claims priority as a continuation of U.S. patent application Ser. No. 09/847,768, filed May 1, 2001, now U.S. Pat. No. 6,901,276, the disclosures of all of which are incorporated herein by reference in their entirety.

TECHNICAL FIELD

The present invention relates to the field of portable computer systems, such as personal digital assistants or palmtop computer systems. Specifically, the present invention relates to a portable computer system with wireless (radio) communication capability.

BACKGROUND OF RELATED ART

A portable computer system, such as a personal digital assistant (PDA) or palmtop, is a computer that is small enough to be held in the hand of a user and is thus "palm-sized." By virtue of their size, portable computer systems are lightweight and so are exceptionally portable and convenient. Portable computer systems are generally powered using either rechargeable or disposable batteries. Because of the desire to reduce the size and weight of the portable computer system to the extent practical, smaller batteries are used. Thus, power conservation in portable computer systems is an important consideration in order to reduce the frequency at which the batteries either need to be recharged or replaced. Consequently, the portable computer system is placed into a low power mode (e.g., a sleep mode or deep sleep mode) when it is not actively performing a particular function or operation.

Some portable computer systems are equipped with radio transmitters and receivers (transceivers) that provide the capability for two-way communication between the portable computer system and a wireless communications network. Accordingly, in addition to the main processor, the portable computer system may include a digital signal processor (DSP) for processing data to be transmitted or data that are received via the transceiver. In the past, when communication occurred between the portable computer system and the wireless network, the portable computer system knew when to expect a transmission. For example, when information or data were being wirelessly transmitted to the portable computer system, it was usually in response to a request initiated by the portable computer system. Thus, the portable computer system was deliberately placed in a receiving mode when a transmission was anticipated, and usually was not in a receiving mode otherwise.

The sophistication of portable computer systems has increased, and therefore portable computer systems are frequently used in applications in which they need to be ready to receive transmitted information at any time, similar to the way a cellular telephone operates. For example, when a cellular telephone is powered on, it is ready to receive an incoming call at any time. Similarly, a portable computer system is ready to receive information at any time that the transceiver is powered on, even if other parts of the portable computer system are in a sleep (low power) mode. Generally, devices transmitting information to the portable computer system have the expectation that the portable computer system will be in a mode in which it can receive the information.

Accordingly, it is desirable for the portable computer system (with a wireless transceiver) to remain "in coverage" when the transceiver is on; that is, it should have a persistent wireless connection to the network. However, due to its portability, there may be occasions in which the portable computer system is moved "out of coverage." For instance, while in one location, the portable computer system may have established a wireless connection over a particular broadcast channel used by the network. After moving to a different location, a signal over that channel may be too weak, and consequently the connection over that channel may be lost.

Currently, when the transceiver is on and the portable computer system moves out of coverage, the portable computer system will attempt to re-establish a wireless connection to the network over a different channel. Often, as described above, the portable computer system may be in a low power mode. Consequently, in order to re-establish connection with the network, the main processor needs to awaken from the low power mode. The main processor then implements a routine to scan for available channels, to select a channel, and to establish a connection over the selected channel.

However, waking up the main processor is problematic because it can consume a significant amount of power, which is inconsistent with the desire to reduce power consumption and conserve the life of the battery. Accordingly, what is needed is a method and/or system that can be used for re-establishing a wireless connection when an existing connection is lost and that can reduce the amount of power needed to do so. The present invention provides a novel solution to these needs.

SUMMARY

The present invention provides a method and system that can be used for re-establishing a wireless connection when an existing connection is lost while reducing the amount of power needed to do so. The present invention provides these advantages and others not specifically mentioned above but described in the sections to follow.

The present invention pertains to a method and system for establishing a wireless connection between a portable computer system and a wireless network. In one embodiment, the wireless network is a Mobitex wireless communication system. The present invention can be implemented when the portable computer system goes out of coverage and a wireless connection needs to be re-established The present invention can also be implemented when the portable computer system is powered on (at startup) and a broadcast channel cannot be acquired.

In one embodiment of the present invention, the portable computer system has a main processor and a digital signal processor (DSP). The main processor is placed in a low power mode, conserving battery power. When an established wireless connection between the portable computer system and the wireless network is lost (e.g., when the portable computer system goes "out of coverage"), broadcast channels used by the wireless network are scanned under direction of the DSP instead of the main processor. From the scan, the DSP can identify channels that have signal strength sufficient for re-establishing the wireless connection. Thus, the main processor remains in the low power mode while the DSP implements a search for an acceptable channel. When the DSP identifies one or more acceptable channels, it wakes up the main processor and identifies to the main processor the channels having sufficient signal strength. The main processor then establishes a wireless connection using one of the channels identified by the DSP. When the DSP cannot find an acceptable channel, it repeats the search at periodic intervals until an acceptable channel is identified.

In one embodiment, the DSP compares the signal strength of each channel to a threshold value in order to compile a list of those channels with a signal strength that is acceptable for a wireless connection. In another embodiment, when multiple acceptable channels are identified by the DSP, the DSP sorts (ranks) the channels according to their respective signal strength. In either embodiment, the main processor is then awakened and establishes a wireless connection with the wireless network, typically using the channel with the highest signal strength.

In one embodiment, certain channels used by the wireless network are disregarded by the DSP. For example, certain channels may not be scanned, or signals received over those channels may be ignored. Thus, channels known to have a lot of noise, or channels that are not suitable for a wireless connection for some other reason, will not cause the processor to be unnecessarily awakened.

Thus, in accordance with the present invention, the DSP implements a process for performing multi-channel scans without waking the main processor. Therefore, only the DSP needs to stay up to direct the scans. Not until the DSP determines that the portable computer system can be placed into coverage, or the user tries to perform an over-the-air operation manually, is the main processor awakened. This stops the deep sleep process and returns control to the protocol stack in the main processor. The main processor can then establish the wireless connection and place the portable computer system back into the in-coverage mode of operation. With the main processor remaining in a low power mode while the DSP performs the multi-channel scan, power is conserved and battery life is prolonged (that is, batteries do not have to changed or charged as frequently).

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 is a flowchart showing the steps in a process for establishing a wireless connection between a portable computer system and a wireless network in accordance with one embodiment of the present invention.

DETAILED DESCRIPTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "scanning" or "determining" or "waking" or "identifying" or "comparing" or "sorting" or "selecting" or "establishing" or "disregarding" or "initiating" or the like, refer to the action and processes of a computer system (e.g., process 500 of FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Platform

Figure 1:
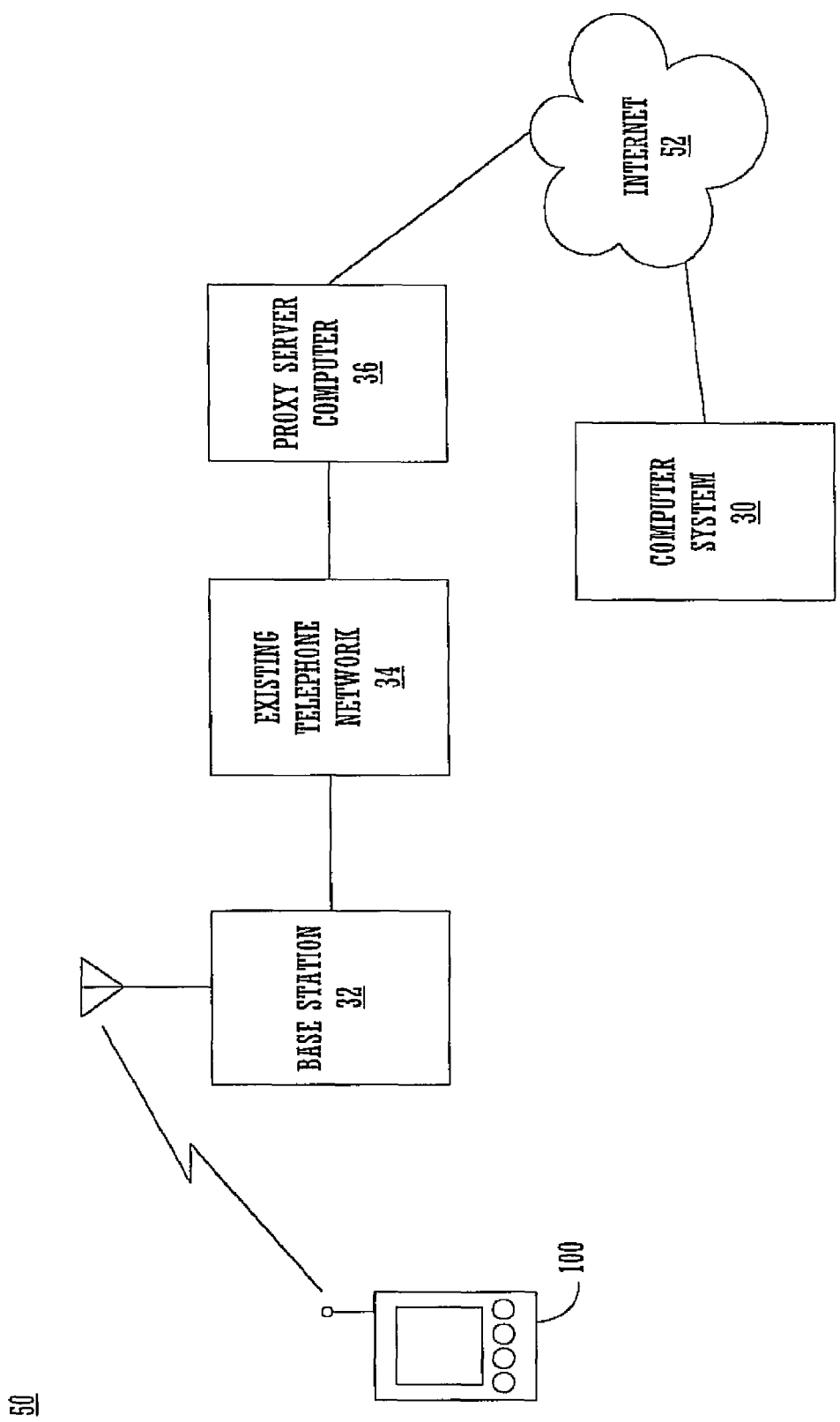
FIG. 1 is a block diagram of an exemplary network environment including a portable computer system in accordance with one embodiment of the present invention.

FIG. 1 is a block diagram of an exemplary network environment 50 including a portable computer system 100 in accordance with one embodiment of the present invention. Portable computer system 100 is also known as a palmtop or palm-sized computer system, a hand-held device, a personal digital assistant (PDA), or a personal information device (PID). In one embodiment, portable computer system 100 has the ability to transmit and receive data and information over a wireless communication interface (e.g., a radio interface). In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34.

Furthermore, proxy server computer system 36 is coupled to the Internet 52, thereby enabling portable computer system 100 to communicate with the Internet 52. Coupled with Internet 52 are multiple computer systems (e.g., servers) exemplified by computer system 30. When communicating with a Web site over Internet 52, protocols such as CTP (Compact Transport Protocol) and CML (Compact Markup Language) can be used by portable computer system 100 in the present embodiment.

It should be appreciated that within the present embodiment, one of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network, planned or envisioned, may be utilized in accordance with the present invention. For example, a wireless connection may be made from portable computer system 100 either directly to the Internet 52 or directly to computer system 30. It is also appreciated that portable computer system 100 may be coupled to computer system networks other than the Internet 52, such as an Intranet, local area network, or the like.

The data and information that are communicated between base station 32 and portable computer system 100 are the same type of information and data that can conventionally be transferred and received over a wireless communication interface. It should be appreciated that one embodiment of a wireless communication system in accordance with the present invention is the Mobitex wireless communication system.

Figure 2:
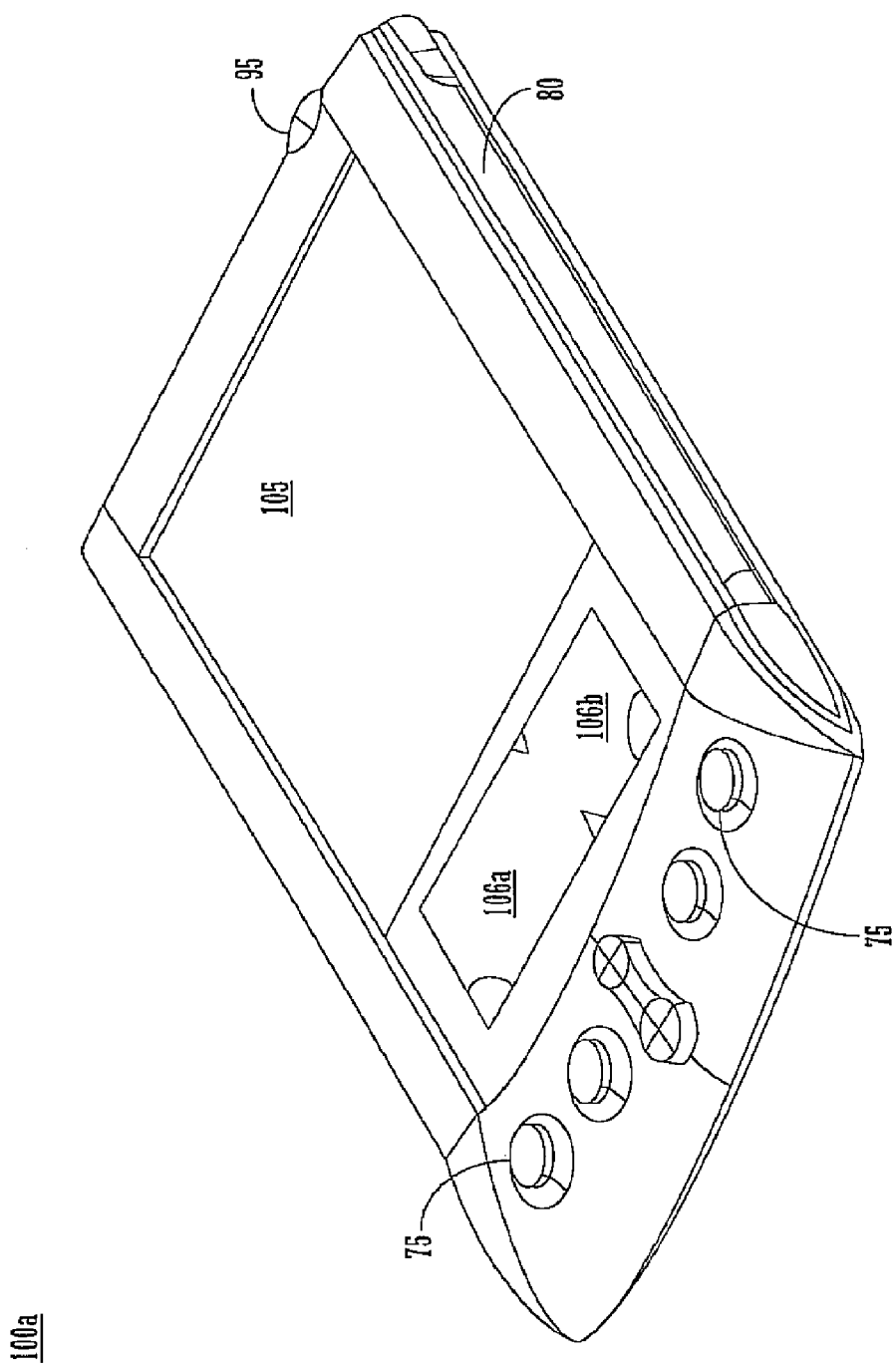
FIG. 2 is a top side perspective view of a portable computer system in accordance with one embodiment of the present invention.

FIG. 2 is a perspective illustration of the top face 100a of one embodiment of the portable computer system 100 of the present invention. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
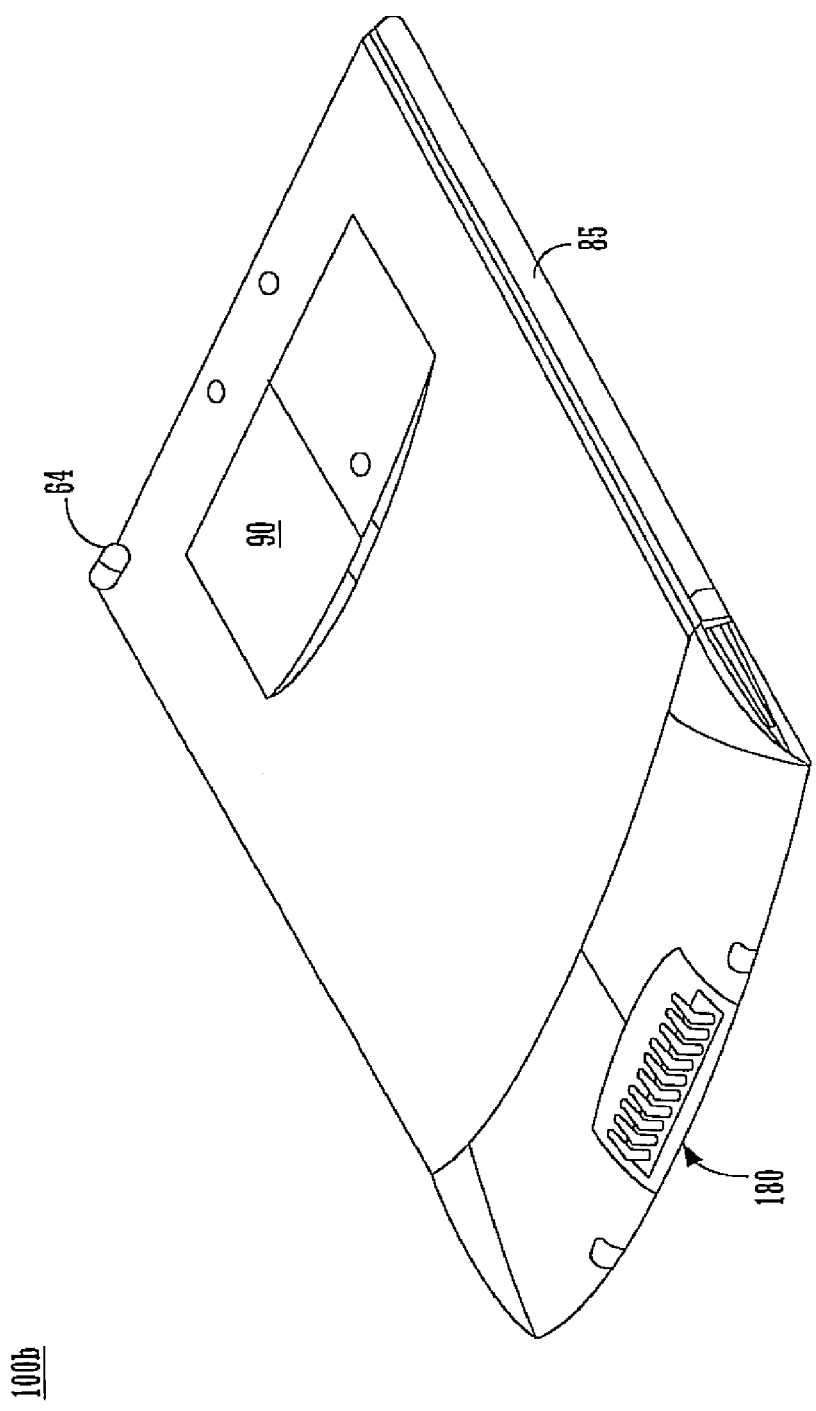
FIG. 3 is a bottom side perspective view of the portable computer system of FIG. 2.

FIG. 3 illustrates the bottom side 100b of one embodiment of the palmtop computer system that can be used in accordance with various embodiments of the present invention. An extendible antenna 85 is shown, and also a battery storage compartment door 90 is shown. A serial port 180 and an infrared port 64 are also shown. In one embodiment, infrared communication mechanism 64 is compliant with the IrDA (Infrared Data Association) standard and protocol.

Figure 4:
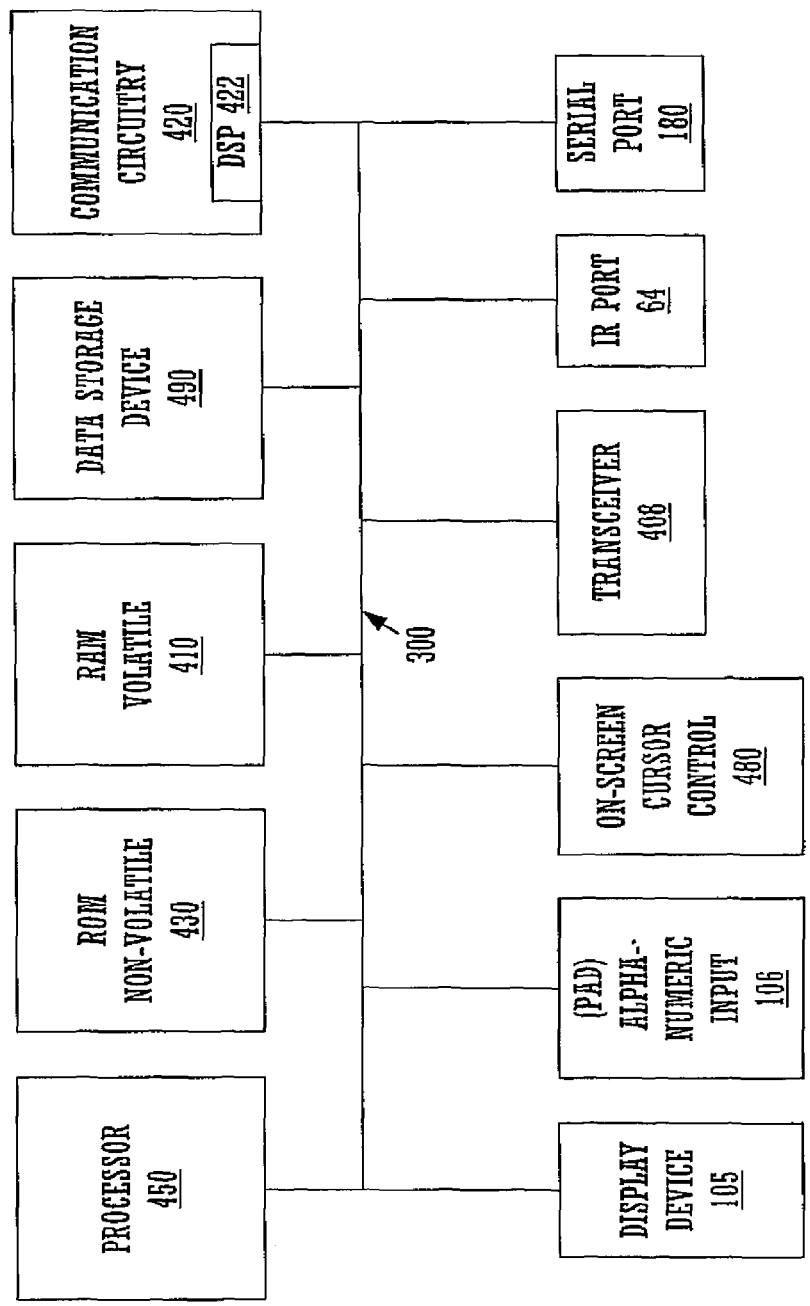
FIG. 4 is a block diagram of an exemplary portable computer system upon which embodiments of the present invention may be practiced.

FIG. 4 is a block diagram of one embodiment of a portable computer system 100 upon which embodiments of the present invention may be implemented. Portable computer system 100 is also often referred to as a PDA, a PID, a palmtop, or a hand-held computer system.

Portable computer system 100 includes an address/data bus 300 for communicating information, a central (main) processor 450 coupled with the bus 300 for processing information and instructions, a volatile memory 410 (e.g., random access memory, RAM) coupled with the bus 300 for storing information and instructions for the main processor 450, and a non-volatile memory 430 (e.g., read only memory, ROM) coupled with the bus 300 for storing static information and instructions for the main processor 450. Portable computer system 100 also includes an optional data storage device 490 (e.g., a memory stick) coupled with the bus 300 for storing information and instructions. Device 490 can be removable. Portable computer system 100 also contains a display device 105 coupled to the bus 300 for displaying information to the computer user.

In the present embodiment, portable computer system 100 includes a transceiver 408 providing it with the capability for wireless communication. The transceiver 408 provides a wireless radio frequency (RF) communication link between computer system 100 and other devices, using any of the various RF protocols and standards. In one embodiment, the Mobitex wireless communication specification is used. It is appreciated that transceiver 408 may be integrated into portable computer system 100, or that transceiver 408 may be a separate component coupled to portable computer system using, for example, serial port 180.

It is appreciated that in another embodiment portable computer system 100 may also include a telephony chipset or the like providing it with the functionality of a cellular phone, in particular the capability to transmit and receive cellular communications. In one embodiment, the telephony chipset is compatible with the standards for GSM and GPRS (Global System for Mobile Communications and General Packet Radio Service, respectively). It is appreciated that other telephony protocols and standards may also be used with the present invention.

In the present embodiment, portable computer system 100 of FIG. 4 includes communication circuitry 420 coupled to bus 300. In one embodiment, communication circuitry 420 is a universal asynchronous receiver-transmitter (UART) module that provides the receiving and transmitting circuits required for serial communication for both the serial port 180 and the infrared port 64. Communication circuitry 420 also includes digital signal processor (DSP) 422 for processing data to be transmitted or data that are received via transceiver 408.

Also included in computer system 100 is an optional alphanumeric input device 106 that, in one implementation, is a handwriting recognition pad ("digitizer"). Alphanumeric input device 106 can communicate information and command selections to main processor 450 via bus 300. In one implementation, alphanumeric input device 106 is a touch screen device. Alphanumeric input device 460 is capable of registering a position where a stylus element (not shown) makes contact.

Portable computer system 100 also includes an optional cursor control or directing device (on-screen cursor control 480) coupled to bus 300 for communicating user input information and command selections to main processor 450. In one implementation, on-screen cursor control device 480 is a touch screen device incorporated with display device 105. On-screen cursor control device 480 is capable of registering a position on display device 105 where a stylus element makes contact. The display device 105 utilized with portable computer system 100 may be a liquid crystal display (LCD) device, a cathode ray tube (CRT), a field emission display device (also called a flat panel CRT), or other display device suitable for generating graphic images and alphanumeric characters recognizable to the user. In the preferred embodiment, display device 105 is a flat panel display.

DSP Control of Multi-Channel Scan for Re-Establishing Connections

FIG. 5 is a flowchart of the steps in a process 500 for establishing a wireless connection between portable computer system 100 (FIG. 4) and a wireless network 50 (FIG. 1) in accordance with one embodiment of the present invention. In the present embodiment, process 500 is implemented as computer-readable program instructions executed by portable computer system 100. Significantly, to conserve power, aspects of process 500 are performed by DSP 422 (FIG. 4) while main processor 450 is in a sleep mode, as will be seen. In step 505 of FIG. 5, with reference also to FIG. 4, the main processor 450 enters a low power mode (e.g., a sleep mode or deep sleep mode) in a conventional manner. In accordance with the present invention, main processor 450 remains in the sleep mode through step 530 of process 500.

In step 510 of FIG. 5, with reference also to FIG. 4, the method and system of the present invention is automatically initiated based on a triggering event. In essence, a triggering event is an indication that portable computer system 100 is out of coverage. In one embodiment, the out of coverage event is defined by the Mobitex specification. In this embodiment, an out of coverage event occurs when portable computer system 100 is unable to acquire a broadcast channel when portable computer system 100 is powered on (at startup). An out of coverage event can also be triggered when portable computer system 100 transmits information to base station 32 (FIG. 1A) and does not receive an acknowledgment signal in return. Also, an out of coverage event can occur when portable computer system 100 does not receive a transmission from network 50 (FIG. 1A) for a specified period of time. It is appreciated that there may be other types of triggering events. It is also appreciated that a user of portable computer system 100 may manually initiate process 500.

In step 515 of FIG. 5, again with also reference to FIG. 4, DSP 422 receives a command to begin the process of multi-channel scans. The command can be received from, for example, the operating system or protocol stack of portable computer system 100. The purpose of the multi-channel scan is to allow DSP 422 to identify those broadcast channels that are strong enough to be used for a wireless connection. As will be seen, DSP 422 compiles the channels that can be used for the wireless connection into a list that is subsequently forwarded to main processor 450.

Thus, in accordance with the present invention, DSP 422, not main processor 450, directs the process of scanning the broadcast channels used by the wireless communication network (e.g., network 50 of FIG. 2), without the involvement of the protocol stack. Therefore, main processor 450 can remain in the sleep mode, and only DSP 422 needs to stay up to direct the scans. As a result, less power is consumed, increasing battery life and reducing the frequency at which batteries need to be replaced or recharged.

The channels used by the wireless communication network are known; in one embodiment, the channels are specified by the Mobitex specification. In the present embodiment, DSP 422 directs the scanning of all channels. However, in one embodiment, DSP 422 ignores certain channels during the scan. For example, interfering sources can add energy (e.g., noise) to certain channels; these channels are known and therefore can be identified to DSP 422 in advance of the scan. DSP 422 may then skip these channels during the scan, or DSP 422 may disregard these channels in the process of identifying channels strong enough to be used for the wireless connection. Thus, DSP 422 is prevented from incorrectly deducing that a proper signal is being received over those channels when in fact only noise or other interference is being received.

In step 520 of FIG. 5, DSP 422 of FIG. 4 determines which broadcast channels will be acceptable for the wireless connection. In one embodiment, DSP 422 accomplishes this by comparing a measure of signal strength to a threshold value. In one embodiment, the measure of signal strength is the RF energy or RSSI (receiver signal strength indicator) of the signal received over a channel. In this embodiment, DSP 422 compares the RF energy or RSSI to the threshold value. If the measure of signal strength is equal to or greater than the threshold value, then the channel is an acceptable candidate and may be used for the wireless connection. If the measure of signal strength is less than the threshold value, than the channel is not an acceptable candidate. It is appreciated that other measures of signal strength and methods other than comparing to a threshold value may be used to identify acceptable broadcast channels in accordance with the present invention.

In step 525 of FIG. 5, if no acceptable broadcast channels are found, process 500 returns to step 515. In this case, after a predefined interval of time has passed, DSP 422 (FIG. 4) repeats steps 515 and 520 until an acceptable channel is found. In one embodiment, DSP 422 also enters into a sleep mode during the interval of time before steps 515 and 520 are repeated.

Step 530 of FIG. 5 addresses the case in which DSP 422 (FIG. 4) has found at least one acceptable channel. When more than one channel has been found, DSP 422 compiles a list of acceptable channels. In one embodiment, DSP 422 sorts the list of channels according to each channel's relative signal strength, based on the measure of signal strength determined in step 520 above.

In step 535 of FIG. 5, with reference also to FIG. 4, DSP 422 wakes up main processor 450 and provides to main processor 450 the list of broadcast channels that can be used to establish a wireless connection. Thus, in accordance with the present invention, main processor 450 remains in the sleep mode until DSP 422 finds at least one acceptable broadcast channel. In other words, main processor 450 is not awakened until preparations for a wireless connection are complete, thereby conserving power and extending battery life. In step 540 of FIG. 5, main processor 450 (FIG. 4) establishes the wireless connection to the wireless network (e.g., network 50 of FIG. 2) using known protocols, such as those described by the Mobitex specification. In one embodiment, main processor 450 uses the broadcast channel having the highest measure of signal strength as determined in step 520 above. Subsequently, main processor 450 can then return to the sleep mode, and portable computer system 100 enters the in-coverage mode in which it periodically checks for transmissions over the wireless connection now established.

In summary, the present invention provides a method and system that reduce the power needed for establishing a wireless connection when an existing connection is lost or when a broadcast channel cannot be acquired. In accordance with the present invention, the DSP implements a process for performing multi-channel scans without waking the main processor. Therefore, only the DSP needs to stay up to direct the scans. Not until the DSP determines that the portable computer system can be placed into coverage, or the user tries to perform an over-the-air operation manually, is the main processor awakened. This stops the deep sleep process and returns control to the protocol stack in the main processor. The main processor can then establish the wireless connection and place the portable computer system back into the in-coverage mode of operation. With the main processor remaining in a low power mode while the DSP performs the multi-channel scan, power is conserved, prolonging the battery life of the portable computer system (that is, batteries do not have to changed or charged as frequently).

The present invention has been described in the context of a portable computer system; however, the present invention may also be implemented in other types of devices having, for example, a main processor and a DSP, such that the main processor is placed in or remains in a low power mode while the DSP performs certain functions on behalf of the processor. Furthermore, it is appreciated that these certain functions may include functions other than those associated with establishing (or re-establishing) wireless connections. The preferred embodiment of the present invention, direct DSP control of multi-channel scan for re-establishing connections in a wirelessly networked device, is thus described. While the present invention has been described in particular embodiments, it should be appreciated that the present invention should not be construed as limited by such embodiments, but rather construed according to the below claims.

What is claimed is:

1. In a portable computer system including at least a first processor and a second processor, a method of establishing a wireless connection between the portable computer system and a wireless network, the method performed by the portable computer system and comprising:
   scanning a plurality of broadcast channels using the second processor while the first processor is in a sleep mode;
   determining which of the broadcast channels are acceptable for the wireless connection using the second processor while the first processor is in the sleep mode;
   ranking the acceptable broadcast channels according to signal strengths using the second processor;
   waking the first processor from the sleep mode;
   selecting, using the first processor, one of the acceptable broadcast channels from the ranking; and
   establishing the wireless connection with the selected broadcast channel using the first processor.

2. The method of claim 1, wherein the determining comprises:
   comparing a signal strength of each of the broadcast channels with a threshold indicating a minimum acceptable signal strength.

3. The method of claim 1, further comprising:
   returning the first processor to the sleep mode after the wireless connection is established.

4. The method of claim 1, further comprising:
   providing information indicating the ranking of the acceptable broadcast channels to the first processor.

5. The method of claim 4, wherein the first processor is awakened from the sleep mode in response to receiving the information.

6. The method of claim 1, wherein the scanning comprises:
   disregarding one or more of the broadcast channels based, at least in part, on noise levels of the broadcast channels.

7. The method of claim 1, wherein the scanning is initiated when a previously established wireless connection between the portable computer system and the wireless network is lost.

8. The method of claim 1, further comprising:
   continuing the scanning of the plurality of broadcast channels when none of the broadcast channels are determined to be acceptable.

9. The method of claim 1, wherein the second processor comprises a digital signal processor.

10. A portable computer system to establish a wireless connection with a wireless network, the portable computer system comprising:
    a first processor;
    a second processor coupled to the first processor;
    a memory storing instructions that, when executed by the second processor, cause the second processor to perform operations comprising:
       placing the first processor in a sleep mode;
       scanning a plurality of broadcast channels;
       determining which of the broadcast channels are acceptable for the wireless connection;
       waking the first processor from the sleep mode; and
       providing a list of the acceptable broadcast channels to the first processor.

11. The portable computer system of claim 10, wherein execution of the instructions to perform the determining causes the second processor to:
    compare a signal strength of each of the broadcast channels with a threshold indicating a minimum acceptable signal strength.

12. The portable computer system of claim 10, further comprising instructions stored in the memory that, when executed by the first processor, cause the first processor to perform operations comprising:
    selecting, from the list of acceptable broadcast channels, the broadcast channel having a highest signal strength; and
    establishing the wireless connection with the selected broadcast channel.

13. The portable computer system of claim 12, wherein execution of the instructions causes the second processor to perform steps further comprising:
    returning the first processor to the sleep mode after the wireless connection is established.

14. The portable computer system of claim 10, wherein execution of the instructions causes the second processor to perform steps further comprising:
    ranking the acceptable broadcast channels according to signal strengths.

15. The portable computer system of claim 10, wherein the first processor is awakened from the sleep mode in response to receiving the list.

16. The portable computer system of claim 10, wherein execution of the instructions to perform the scanning causes the second processor to:
    disregard one or more of the broadcast channels based, at least in part, on noise levels of the broadcast channels.

17. The portable computer system of claim 10, wherein the scanning is initiated when a previously established wireless connection between the portable computer system and the wireless network is lost.

18. The portable computer system of claim 10, wherein execution of the instructions causes the second processor to perform steps further comprising:
    continuing the scanning of the plurality of broadcast channels when none of the broadcast channels are determined to be acceptable.

19. The portable computer system of claim 10, wherein the second processor comprises a digital signal processor.

20. A non-transitory computer-readable medium containing program instructions that, when executed by a portable computer system including at least a first processor and a second processor, cause the portable computer system to establish a wireless connection with a wireless network by performing operations comprising:
    scanning a plurality of broadcast channels using the second processor while the first processor is in a sleep mode;
    determining which of the broadcast channels are acceptable for the wireless connection using the second processor while the first processor is in the sleep mode;
    ranking the acceptable broadcast channels according to signal strengths using the second processor;
    waking the first processor from the sleep mode;
    selecting, using the first processor, one of the acceptable broadcast channels from the ranking; and establishing the wireless connection with the selected broadcast channel using the first processor.

21. The non-transitory computer-readable medium of claim 20, wherein execution of the instructions perform the determining by:
   comparing a signal strength of each of the broadcast channels with a threshold indicating a minimum acceptable signal strength.

22. The non-transitory computer-readable medium of claim 20, wherein execution of the instructions causes the portable computer system to perform steps further comprising:
   returning the first processor to the sleep mode after the wireless connection is established.

23. The non-transitory computer-readable medium of claim 20, wherein execution of the instructions causes the portable computer system to perform steps further comprising:
   providing information indicating the ranking of the acceptable broadcast channels to the first processor.

24. The non-transitory computer-readable medium of claim 23, wherein the first processor is awakened from the sleep mode in response to receiving the information.

25. The non-transitory computer-readable medium of claim 20, wherein execution of the instructions to perform the scanning causes the second processor to:
   disregard one or more of the broadcast channels based, at least in part, on noise levels of the broadcast channels.

26. The non-transitory computer-readable medium of claim 20, wherein the scanning is initiated when a previously established wireless connection between the portable computer system and the wireless network is lost.

27. The non-transitory computer-readable medium of claim 20, wherein execution of the instructions causes the second processor to perform steps further comprising:
   continuing the scanning of the plurality of broadcast channels when none of the broadcast channels are determined to be acceptable.

28. The non-transitory computer-readable medium of claim 20, wherein the second processor comprises a digital signal processor.

29. A portable computer system, including at least a first processor and a second processor, to establish a wireless connection between the portable computer system and a wireless network, the portable computer system comprising:
   means for scanning a plurality of broadcast channels using the second processor while the first processor is in a sleep mode;
   means for determining which of the broadcast channels are acceptable for the wireless connection using the second processor while the first processor is in the sleep mode;
   means for ranking the acceptable broadcast channels according to signal strengths using the second processor;
   means for waking the first processor from the sleep mode;
   means for selecting, using the first processor, one of the acceptable broadcast channels from the ranking; and
   means for establishing the wireless connection with the selected broadcast channel using the first processor.

30. The portable computer system of claim 29, wherein the means for determining is to:
   compare a signal strength of each of the broadcast channels with a threshold indicating a minimum acceptable signal strength.

31. The portable computer system of claim 29, further comprising:
   means for returning the first processor to the sleep mode after the wireless connection is established.

32. The portable computer system of claim 29, further comprising:
   means for providing information indicating the ranking of the acceptable broadcast channels to the first processor.

33. The portable computer system of claim 32, wherein the first processor is awakened from the sleep mode in response to receiving the information.

34. The portable computer system of claim 29, wherein the means for scanning is to:
   disregard one or more of the broadcast channels based, at least in part, on noise levels of the broadcast channels.

35. The portable computer system of claim 29, wherein the scanning is initiated when a previously established wireless connection between the portable computer system and the wireless network is lost.

36. The portable computer system of claim 29, further comprising:
   means for continuing the scanning of the plurality of broadcast channels when none of the broadcast channels are determined to be acceptable.

37. The portable computer system of claim 29, wherein the second processor comprises a digital signal processor.

\* \* \* \* \*